United States Patent [19]
Ho et al.

[11] 3,840,296
[45] Oct. 8, 1974

[54] PHOTOGRAPHIC EXPOSURE INDICATOR AND BATTERY TEST CIRCUIT

[75] Inventors: Edward J. Ho, Buffalo Grove; Robert C. Mau, Chicago, both of Ill.

[73] Assignee: Bell & Howell Company, Chicago, Ill.

[22] Filed: Sept. 14, 1972

[21] Appl. No.: 289,045

[52] U.S. Cl. .................................................. 354/44
[51] Int. Cl. .......................................... G03b 7/10
[58] Field of Search ....... 95/10 CE, 10 CD; 352/141

[56] References Cited
UNITED STATES PATENTS

| | | | |
|---|---|---|---|
| 3,436,158 | 4/1969 | Schmitt | 95/10 X |
| 3,520,597 | 7/1970 | Fujii | 95/10 CD |
| 3,581,643 | 6/1971 | Yoshimura | 95/10 X |
| 3,664,244 | 5/1972 | Painton | 95/10 |
| 3,699,857 | 10/1972 | Wagner | 95/10 |

*Primary Examiner*—Samuel S. Matthews
*Assistant Examiner*—Michael L. Gellner
*Attorney, Agent, or Firm*—John R. Hoffman; William K. Serp

[57] ABSTRACT

A device for indicating under or over exposure conditions with respect to photographic film in a camera including a battery test circuit. The operative condition of the iris meter is sensed by an under exposure sensing means and an over exposure sensing means. The output of each sensing means is used to actuate an indicator light. A battery test circuit is included to test the battery condition under load and utilizes the indicator light as a means of providing a battery check indication.

5 Claims, 2 Drawing Figures

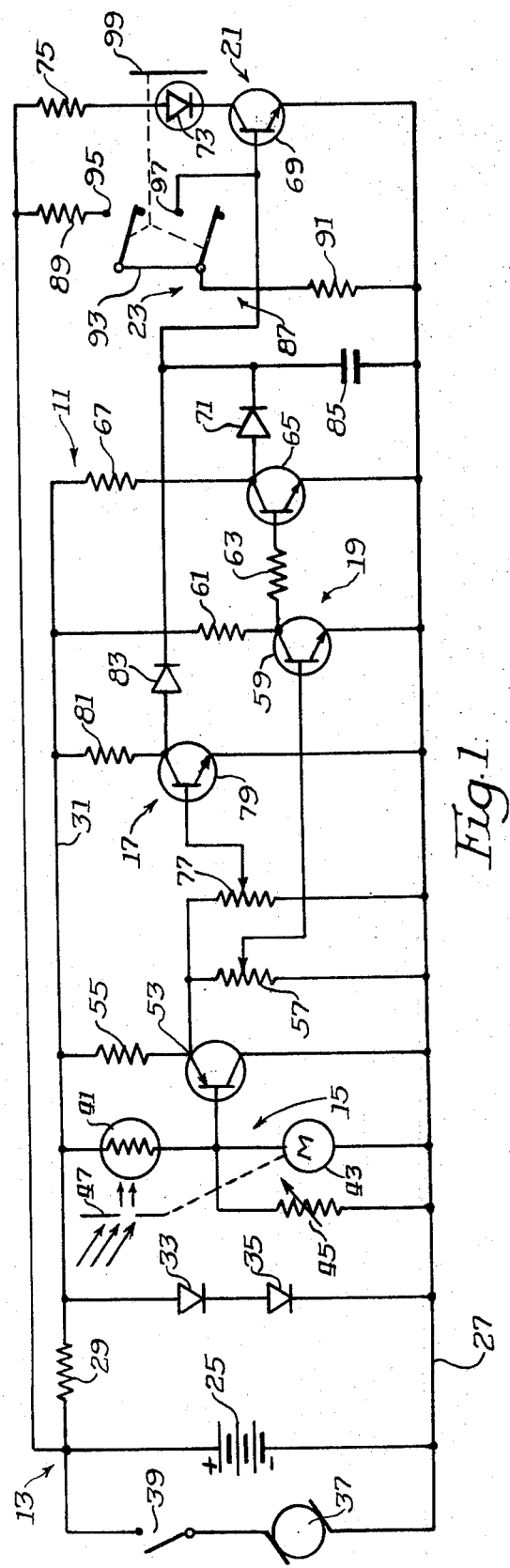
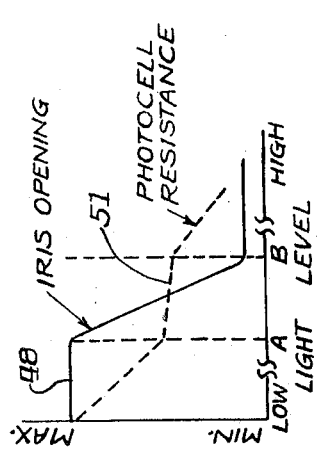
Fig.2.
Fig.1.

PHOTOGRAPHIC EXPOSURE INDICATOR AND BATTERY TEST CIRCUIT

This invention generally relates to an exposure indicating apparatus for use in photography and more directly relates to an under or over exposure indicator in combination with an automatic exposure apparatus particularly adapted for use in a photographic camera.

With reference to present day automatic exposure cameras, the iris opening, the shutter speed, or both, are adjusted by automatic means in response to prevailing lighting conditions as measured by a photosensitive cell exposed to the available light. These parameters are varied to maintain a light level at the film plane which is compatible with the emulsion speed of the film being used. It will be appreciated that the light range over which such an automatic system can accommodate varying light levels is, to a degree, limited. In the event the light level drops below or rises above the range which the camera exposure mechanism can accommodate, present systems provide an indication to the user that the automatic feature is out of range, and that film exposure under such light conditions will produce unacceptable results. Various arrangements have been described for providing an out of range indication. One such arrangement utilizes a meter delineating an acceptable scale segment. Other devices have been described wherein a pair of individual lights are provided, each of which is energized to correspond with an undesired lighting condition. Such systems are relatively complex and require considerable space when considered with respect to the available space in modern cameras. Additionally, the cost of such devices is relatively expensive due particularly to the complexity or number of the indicating devices used.

It is a main object of this invention to provide an improved exposure indicating apparatus which is relatively economical and compact in its construction.

DESCRIPTION OF THE DRAWINGS

FIG. 1 is a schematic diagram of an automatic exposure circuit for a photographic camera embodying certain features of the invention.

FIG. 2 is a graphical representation of the operating characteristics of certain of the components illustrated in FIG. 1.

DESCRIPTION OF THE ILLUSTRATED EMBODIMENT

Briefly, a control circuit 11 is powered by a battery, regulated power supply 13. The supply 13 feeds an iris control circuit 15 which in turn drives under-range sensing means 17 as well as an over-range sensing means 19. The sensing means 17 and 19 feed an indicating means 21 which provides a visual indication in the form of a light in the event the iris' ability to compensate for the available light level is exceeded. The circuit additionally includes a battery test circuit 23 which provides a selectable battery test under load conditions. The exposure indicating means 21 is also used for battery test purposes and provides a visual indication when the battery under test-load supplies a predetermined current.

More particularly, the power supply 13 includes a battery 25, the negative pole of which is connected to a negative bus 27 of the supply, and the positive pole of which is connected through a voltage dropping resistor 29 to the positive bus or supply terminal 31 of the supply 13. Serving to stabilize the voltage across the circuit 11 and provide a voltage reference are a pair of series connected diodes 33 and 35, oriented across the supply for conduction. The cathode of diode 35 being connected to the negative bus 27 and the anode of diode 33 being connected to the positive supply terminal 31. Selectively connected across the battery 25 is a camera drive motor 37 one terminal of which is connected to the negative battery pole and the other terminal of which is connected through an SPST switch 39 to the positive pole.

The iris control circuit 15 includes a photo resistive cell 41 in series with an iris meter 43. This series combination being connected between the positive 31 and negative 27 supply terminals. Serving to adjust the iris meter 43 for the desired range to accommodate the speed of the film selected and to dampen the meter movement is a parallel connected adjustable trim resistor 45. The iris meter 43 is mechanically coupled to an adjustable iris 47 through which the external light passes to the film as well as the photoresistive cell 41. With reference to the graph of FIG. 2, the operative range over which the iris can correct for available light levels is between points A and B on the abscissa of the graph indicated "Light Level." The operative condition of the iris 47 is represented by curve 48. Below point A the iris 47 has reached its maximum opening and cannot open further to allow additional light to pass to the film and photoresistive cell 41. Above point B, the iris 47 has closed to its minimum opening and additional scene illumination will result in an over-exposed film. The operative range A-B of the iris meter is generally rather small and corresponds to a small change in the meter current as indicated by the slight slope of a photocell resistance curve 51 between points A and B of the graph. An increase in the light level in the operative range A-B will result in an increased current through the iris meter 43 which in turn produces a decrease in the iris 47 opening which reduces the light falling on the photocell 41. The iris 47 will, under such conditions, close down until an equilibrium is reached. The trim resistor 45 serves to dampen the meter 43 movement to prevent oscillation or instability in the servo loop which includes the iris 47 coupled to the iris meter 43 and the photoresistive cell 41. The junction of the meter 43 and the photocell 41 is coupled to the base of a PNP buffer transistor 53 which is operated in a linear mode. The collector of the transistor 53 is connected to the minus bus 27 and the emitter is connected through an emitter resistor 55 to the positive bus 31 of the supply 13. The emitter of the buffer transistor 53 is coupled to the under-range 17 and the over-range 19 sensing means.

The over-range sensing means 19 includes an adjustable over-range potentiometer 57, the fixed terminals of which are connected between the emitter of the buffer transistor 53 and the ground bus 27 and the wiper of which is connected to the base of an NPN over-range sensing transistor 59. The potentiometer 57 is initially adjusted so that the over-range sensing transistor 59 is off or nonconducting when the light level is in the operative range A-B and below A. When the light lever increases above B, the emitter voltage on the buffer transistor 53 will rise turning on the over-range sensing transistor 59. The emitter of the overrange sensing transistor 59 is connected to the ground bus 27 and the collector is connected through a current limiting resistor 61 to the positive supply terminal 31 and through a coupling resistor 63 to the base of an over-range inverting transistor 65. The over-range inverting transistor serves to invert the signal from the over-range sensing transistor 59. The collector of the over-range inverting transistor 65 is connected to the positive supply terminal 31 by means of a collector current limiting resistor 67. Additionally, the collector is connected to the base of an NPN indicator switching transistor 69 through an over-range steering diode 71 the cathode of which is connected to the base of the switching transistor 69. Thus, when the light level increases above the operating range B, the over-range sensing transistor 59 is on and the inverting transistor 65 is off providing base current through the collector resistor 67 and the steering diode 71 to the base of the indicator transistor 69 turning it on and causing current to flow through a light emitting diode (LED) 73. The diode 73 is connected in series with the collector of the indicator transistor 69. The cathode of the diode 73 is connected to the collector of the transistor 69 and the anode is connected through a current limiting resistor 75 directly to the positive terminal of the battery 25. The emitter of the indicator transistor 69 is connected to the ground bus 27. Preferably, the diode 73 is mounted within the camera in convenient view of the user during focusing of the camera.

Similarly, the under-range sensing means 17 includes an under-range potentiometer 77 the fixed terminals of which are connected to the ground bus 27 and the emitter of the PNP buffer transistor 53. The wiper of the potentiometer 77 is connected to the base of an NPN under-range switching transistor 79. The emitter of the transistor 79 is connected to the ground bus and the collector through a collector resistor 81 to the positive terminal 31 of the supply 13. Serving to connect the collector of the under-range switching transistor 79 to the base of the indicator control transistor 69 is an under-range steering diode 83, the anode of which is connected to the collector of the switching transistor 79, and the cathode of which is connected to the base of the indicator transitor 69. Flickering of the diode (LED) 73 indicating light is avoided by means of a capacitor 85 connected between the base of the indicating transistor 69 and the ground bus 27. In the event the bias upon the base of the indicator transistor 69 changes abruptly due to transient variations in the light level, the capacitor 85 will smooth out such variations preventing annoying, instantaneous changes in the diode 73 indicator light.

Additionally, the circuit includes the battery test circuit 23 which utilizes a series resistive network 87 including load resistors 89 and 91 connected across the battery 25 in response to actuation of a double pole, double throw battery test switch 93. The load resistor 89 is connected between the positive pole of the battery 25 and the normally open fixed contact 95 of the first pole of the switch 93. The second load resistor 91 is connected between the negative bus 27 of the battery 25 and both of the movable contacts of the switch 93. Thus, upon actuation of the switch 93 the resistors 89 and 91 are connected in series directly across the battery terminals. The resistor values are selected to simulate the motor load during battery test. The normally open fixed contact 97 of the second pole of the switch 93 is connected to the base of the indicator switching transistor 69 so that when the switch 93 is held in the test position the diode (LED) 73 indicator light will provide an indication of the battery condition. The ratio of the load resistor 89 and 91 is selected so that the diode 73 will be switched on when the battery 25 is of sufficient charge to drive the motor 37 and will not light when the charge has dropped below this desired value. As illustrated the battery test switch 93 is mechanically coupled to a colored light filter 99 so that upon depression of the battery test switch the filter is positioned between the view of the operator and the diode 73. Thus, a color change will be provided to give the operator a signal that a battery check is in process.

In use, the operator depresses the battery test switch 93, and if the battery charge is sufficient to drive the motor 37, the diode (LED) 73 will provide a suitable indication. The operator then directs the camera at the image to be photographed and the reflected light passes through the iris 47 and against the photoresistive cell 41 causing the iris meter 43 to adjust the light level in the camera to the desired value for the speed of the film being used. If the iris meter 43 is within the range of the iris control, both the under-range 79 and the over-range inverting transistors 65 will be on and the diode (LED) 73 light off. Should the light level drop below the level for which iris 47 compensation can be attained, the under-range transistor 79 will be off biasing the indicator transistor 69 on thus providing a visual indication to the operator that the available light from the scene is low. Conversely, if the light from the scene is excessive, that is, if it is above the level for which the iris 47 can compensate, the over-range inverting transistor 65 will turn off switching on the indicator transistor 69 so as to provide a visual indication to the operator that the available light is above the range over which the iris 47 can accommodate.

While this invention has been particularly shown and described with reference to a preferred embodiment thereof, it will be understood by those skilled in the art that various changes in form and detail can be made without departing from the spirit and scope of the invention.

What is claimed is:

1. A control circuit for a photographic camera including a power source providing power to a photoresistive cell connected in series with an iris meter which is coupled to an adjustable iris for controlling the quantity of light supplied to a photographic film comprising a first sensing means for sensing a first position of said iris and providing a signal when the iris has reached said first position, said first sensing means including first sampling means for sampling the voltage across said iris meter and first adjustment means for varying said sample voltage and a first sensing transistor coupled to said adjustment means so that said first sensing means will provide a first signal when said sample voltage reaches a first preset value, a second sensing means for sensing a second position of said iris and providing a second signal when the iris has reached said second position, said second sensing means including second sampling means for sampling the voltage across said iris meter and second adjustment means for varying said sample voltage and a second sensing transistor coupled to said adjustment means so that said second sensing means will provide a second signal when said sample voltage reaches a second preset value, and indicating means coupled to said first and second sensing transistors serving to provide an indication of the operative condition of said iris.

2. The control circuit of claim 1 wherein said second sensing means includes an inverting transistor coupled to the output of said second switching transistor and said coupling means includes a first steering diode connected between said first switching transistor and said indicating means and a second steering diode connected between said first inverting transistor and said indicating means.

3. The control circuit of claim 2, wherein said indicating means includes an indicating transistor for selectively switching on a light source located within the camera and a capacitor connected to the base of said indicating transistor and an additional terminal of said indicating transistor and serving to minimize the effects of transient changes to the signal applied to the base of said indicating transistor.

4. A control circuit for a photographic camera having an adjustable iris for controlling the quantity of light supplied to a photographic film, said control circuit including a power source, light sensitive iris control means connected to said power source for generating a light signal representative of the quantity of light received by said camera, sensing means connected to said iris control means for sensing when said light signal indicates the presence of too much light or not enough light in relation to a predetermined light range and generating an indicating signal representative thereof, exposure indicating means to provide a visual indication of too much or not enough light, and indicating switching means connected between said sensing means and said indicating means responsive to said light signal for actuating said indicating means whenever said light signal indicates there is either too much light or too light light, the improvement in said sensing means comprising:

A photoresistive cell connected in series with said iris control means;

under-range sensing means for sensing when there is not a sufficient amount of light and providing an under-range signal representative thereof, and wherein said under-range sensing means includes a first sensing transistor and a first means for sampling the voltage across said iris meter and first adjustment means for varying said sample voltage so that the under-range sensing means will provide said under-range signal when said sample voltage reaches a preset value, over-range sensing means for sensing when there is too much light and providing an over-range signal representative thereof, and wherein said over-range sensing means includes a second sensing transistor and second means for sampling the voltage across said iris meter and second adjustment means for varying said sample voltage so that said over-range sensing means will provide said over-range signal when said sample voltage reaches a second preset value; and means for coupling the output of said first and second sensing transistors to said indicating means.

5. The control circuit of claim 4 wherein said over-range sensing means includes an inverting transistor coupled to the output of said second switching transistor and said coupling means includes a first steering diode connected between said first switching transistor and said indicating means and a second steering diode connected between said inverting transistor and said indicating means.

* * * * *